United States Patent
Li et al.

(10) Patent No.: US 11,564,157 B2
(45) Date of Patent: Jan. 24, 2023

(54) DATA TRANSMISSION METHOD, APPARATUS AND DEVICE AND COMPUTER-READABLE STORAGE MEDIUM

(71) Applicants: China Mobile Communication Co., Ltd Research Institute, Beijing (CN); China Mobile Communications Group Co., Ltd., Beijing (CN)

(72) Inventors: Aihua Li, Beijing (CN); Xin Zhou, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 16/961,298

(22) PCT Filed: Dec. 19, 2018

(86) PCT No.: PCT/CN2018/122045
§ 371 (c)(1),
(2) Date: Jul. 10, 2020

(87) PCT Pub. No.: WO2019/137169
PCT Pub. Date: Jul. 18, 2019

(65) Prior Publication Data
US 2021/0084579 A1  Mar. 18, 2021

(30) Foreign Application Priority Data
Jan. 11, 2018 (CN) .......................... 201810027191.9

(51) Int. Cl.
*H04W 8/24* (2009.01)
*H04W 48/18* (2009.01)
(Continued)

(52) U.S. Cl.
CPC .......... *H04W 48/18* (2013.01); *H04L 69/322* (2013.01); *H04W 8/08* (2013.01); *H04W 8/18* (2013.01); *H04W 8/24* (2013.01); *H04W 80/10* (2013.01)

(58) Field of Classification Search
CPC ......... H04W 48/18; H04W 8/08; H04W 8/18; H04W 8/24; H04W 80/10; H04W 40/02; H04L 69/322
See application file for complete search history.

(56) References Cited

U.S. PATENT DOCUMENTS

2017/0339609 A1    11/2017  Youn et al.
2018/0199240 A1*    7/2018  Dao .................... H04L 41/0894
(Continued)

FOREIGN PATENT DOCUMENTS

| CN | 107018542 A | 8/2017 |
| CN | 107548127 A | 1/2018 |
| WO | 2018232241 A1 | 12/2018 |

OTHER PUBLICATIONS

TS23.502 NF services supported by AMF-system procedures Approval; 52-172234; Busan, Korea; Mar. 27-31, 2017; 22 pages.
(Continued)

*Primary Examiner* — Chuong A Ngo
(74) *Attorney, Agent, or Firm* — Price Heneveld LLP

(57) ABSTRACT

A data transmission method, apparatus, device, and a computer-readable storage medium are provided. The data transmission method of the present disclosure includes receiving data sent by a User Equipment UE, determining a Session Management Function SMF, and forwarding the data to the SMF, wherein after the SMF receives the data, the SMF forwards the data to a User Plane Function UPF.

15 Claims, 7 Drawing Sheets

---

Receiving data sent by a UE — 101

Determining a SMF and forwarding the data to the SMF, wherein after the SMF receives the data, the SMF forwards the data to a UPF — 102

(51) Int. Cl.
H04L 69/322 (2022.01)
H04W 8/08 (2009.01)
H04W 8/18 (2009.01)
H04W 80/10 (2009.01)

(56) References Cited

U.S. PATENT DOCUMENTS

2018/0227872 A1* 8/2018 Li .......................... H04W 48/16
2019/0357106 A1 11/2019 Ke et al.
2021/0360715 A1* 11/2021 Myhre .............. H04W 36/0033
2021/0360741 A1* 11/2021 Shimojou ............... H04L 47/78

OTHER PUBLICATIONS

"3rd Generation Partnership Project;Technical Specification Group Services and System Aspects; System Architecture for the 5G System;Stage 2(Release 15)", 3GPP TS 23.501, V15.0.0, (Dec. 2017), Valbonne, France.

"3rd Generation Partnership Project;Technical Specification Group Services and System Aspects; Study on Architecture for Next Generation System(Release 14)", 3GPP TR 23.799, V14.0.0, (Dec. 2016), Valbonne, France.

* cited by examiner

DATA TRANSMISSION METHOD, APPARATUS AND DEVICE AND COMPUTER-READABLE STORAGE MEDIUM

CROSS-REFERENCE TO RELATED APPLICATION

This application is a U.S. national phase application of a PCT Application No. PCT/CN2018/122045 filed on Dec. 19, 2018, which claims a priority to Chinese Patent Application No. 201810027191.9 filed in China on Jan. 11, 2018, the disclosures of which are incorporated in their entirety by reference herein.

TECHNICAL FIELD

The present disclosure relates to the field of communication technology, in particular, relates to a data transmission method, a data transmission apparatus, a device, and a computer-readable storage medium.

BACKGROUND

In a Fifth-Generation (5G) technical solution, a User Equipment (UE) needs to establish a radio signaling bearer and a data plane bearer before transmitting data. After interaction and negotiation in a signaling plane, the UE, a radio side and a core network establish a Protocol Data Unit (PDU) session on an end-to-end path, and then the UE can send data through a data plane.

In this process, the number of signalings interacted among the UE, the radio network and the core network is large, radio resource consumption is significant, and consumption at the UE is also significant. Therefore, a data transmission method in the related art consumes a large amount of resources.

SUMMARY

In a first aspect, a data transmission method applied to an Access and Mobility Management Function (AMF) is provided. The method includes receiving data sent by a User Equipment (UE); determining a Session Management Function (SMF) and forwarding the data to the SMF, wherein after the SMF receives the data, the SMF forwards the data to a User Plane Function (UPF).

Wherein determining the SMF includes: determining whether the UE establishes a Protocol Data Unit (PDU) session; when the UE does not establish the PDU session, determining the SMF according to first selection assistance information; when the UE establishes the PDU session, determining the SMF according to second selection assistance information.

Wherein, the first selection assistance information includes any one or more of following: a Data Network Name (DNN), slice assistance information, a local configuration or policy of an operator, and a routing indicator; the second selection assistance information includes any one or more of following: a PDU session identifier, a DNN, slice assistance information, a local configuration or policy of an operator, and a routing indicator.

Wherein the data is carried in a Non-Access-Stratum Data Protocol Data Unit (NAS Data PDU).

In a second aspect, a data transmission method applied to an Access and Mobility Management Function (AMF) is provided. The method includes after receiving data sent by a User Equipment (UE), determining whether the UE establishes a Protocol Data Unit (PDU) session; determining a Session Management Function (SMF) according to first selection assistance information when the UE does not establish the PDU session; determining the SMF according to second selection assistance information when the UE establishes the PDU session.

Wherein, the first selection assistance information includes any one or more of following: a Data Network Name (DNN), slice assistance information, a local configuration or policy of an operator, and a routing indicator; the second selection assistance information includes any one or more of following: a PDU session identifier, a DNN, slice assistance information, a local configuration or policy of an operator, and a routing indicator.

In a third aspect, a data transmission method applied to an Access and Mobility Management Function (AMF) is provided. The method includes receiving data sent by a User Equipment (UE); selecting a User Plane Function (UPF), and forwarding the data to the UPF.

Wherein selecting the UPF includes: selecting the UPF according to third selection assistance information; wherein the third selection assistance information includes any one or more of a Data Network Name (DNN), slice assistance information, a local configuration or policy of an operator, and a routing indicator.

In a fourth aspect, a data transmission method applied to a Session Management Function (SMF) is provided. The method includes: receiving data forwarded by an Access and Mobility Management Function (AMF); forwarding the data to a User Plane Function (UPF).

Wherein forwarding the data to the UPF includes: forwarding the data to the UPF through a N4 message.

In a fifth aspect, a data transmission method applied to a User Plane Function (UPF) is provided. The method includes: receiving data forwarded by a Session Management Function (SMF); forwarding the data to a data network according to a data forwarding rule.

Wherein receiving the data forwarded by the SMF includes: receiving the data forwarded by the SMF through a N4 message.

In a sixth aspect, a data transmission method applied to a Use Plane Function (UPF) is provided. The method includes receiving data forwarded by an Access and Mobility Management Function (AMF); forwarding the data to a data network according to a data forwarding rule.

In a seventh aspect, a data transmission method applied to a User Equipment (UE) is provided. The method includes sending data to a base station so that the base station forwards the data to an Access and Mobility Management Function (AMF).

Wherein the data is carried in a Non-Access-Stratum Data Protocol Data Unit (NAS Data PDU).

In an eighth aspect, a data transmission method applied to a base station. The base station includes: receiving data sent by a User Equipment (UE); forwarding the data to an Access and Mobility Management Function (AMF).

Wherein the data is carried in a Non-Access-Stratum Data Protocol Data Unit (NAS Data PDU).

Wherein, forwarding the data to the AMF includes: forwarding the data to the AMF through a N2 message.

In a ninth aspect, a data transmission apparatus is provided. The data transmission apparatus includes: a processor and a transceiver; wherein the transceiver is configured to receive data sent by a User Equipment (UE); the processor is configured to determine a Session Management Function (SMF) and forward the data to the SMF, wherein after the SMF receives the data, the SMF forwards the data to a User Plane Function (UPF).

Wherein the processor is further configured to: determine whether the UE establishes a Protocol Data Unit (PDU) session; determine the SMF according to first selection assistance information when the UE does not establish the PDU session; determine the SMF according to second selection assistance information when the UE establishes the PDU session.

Wherein, the first selection assistance information includes any one or more of following: a Data Network Name (DNN), slice assistance information, a local configuration or policy of an operator, and a routing indicator; the second selection assistance information includes any one or more of following: a PDU session identifier, a DNN, slice assistance information, a local configuration or policy of an operator, and a routing indicator.

Wherein the data is carried in a Non-Access-Stratum Data Protocol Data Unit (NAS Data PDU).

In a tenth aspect, a data transmission apparatus is provided. The apparatus includes a processor and a transceiver; wherein the processor is configured to: after receiving, through the transceiver, data sent by a User Equipment (UE), determine whether the UE establishes a Protocol Data Unit (PDU) session; determine a Session Management Function (SMF) according to first selection assistance information when the UE does not establish the PDU session; determine the SMF according to second selection assistance information when the UE establishes the PDU session.

Wherein, the first selection assistance information includes any one or more of following: a Data Network Name (DNN), slice assistance information, a local configuration or policy of an operator, and a routing indicator; the second selection assistance information includes any one or more of following: a PDU session identifier, a DNN, slice assistance information, a local configuration or policy of an operator, and a routing indicator.

In an eleventh aspect, a data transmission apparatus is provided. The apparatus includes a processor and a transceiver; wherein the transceiver is configured to receive data sent by a User Equipment (UE); the processor is configured to select a User Plane Function (UPF), and forward the data to the UPF.

Wherein, the processor is further configured to select the UPF according to third selection assistance information; wherein the third selection assistance information includes any one or more of following: a Data Network Name (DNN), slice assistance information, a local configuration or policy of an operator, and a routing indicator.

In a twelfth aspect, a data transmission apparatus is provided. The apparatus includes a processor and a transceiver; wherein the processor is configured to receive, through the transceiver, data forwarded by an Access and Mobility Management Function (AMF), and forward the data to a User Plane Function (UPF) through the transceiver.

Wherein the processor is further configured to forward the data to the UPF through a N4 message.

In a thirteenth aspect, a data transmission apparatus is provided. The apparatus includes a processor and a transceiver; wherein the processor is configured to receive, through the transceiver, data forwarded by a Session Management Function (SMF); forward the data to a data network according to a data forwarding rule through the transceiver.

Wherein the transceiver is further configured to: receive the data forwarded by the SMF through a N4 message.

In a fourteenth aspect, a data transmission apparatus is provided. The apparatus includes a processor and a transceiver; wherein the processor is configured to receive, through the transceiver, data forwarded by an Access and Mobility Management Function (AMF); forward the data to a data network according to a data forwarding rule through the transceiver.

In a fifteenth aspect, a data transmission apparatus is provided. The apparatus includes a processor and a transceiver; wherein the processor is configured to send data to a base station through the transceiver so that the base station forwards the data to an Access and Mobility Management Function (AMF).

Wherein the data is carried in a Non-Access-Stratum Data Protocol Data Unit (NAS Data PDU).

In a sixteenth aspect, a data transmission apparatus is provided. The apparatus includes a processor and a transceiver; wherein the processor is configured to receive, through the transceiver, data sent by a User Equipment (UE); forward the data to an Access and Mobility Management Function (AMF).

Wherein the data is carried in a Non-Access-Stratum Data Protocol Data Unit (NAS Data PDU).

Wherein the transceiver is further configured to forward the data to the AMF through a N2 message.

In a seventeenth aspect, a communication device is provided. The communication device includes a transceiver, a storage, a processor, and a computer program stored on the storage and executable by the processor, wherein, when the computer program is executed by the processor, the processor implements steps in the method according to any one of the above first aspect to eighth aspect.

In an eighteenth aspect, a computer-readable storage medium for storing a computer program is provided. When the computer program is executed by a processor, the processor implements steps in the method according to any one of the above first aspect to eighth aspect.

DETAILED DESCRIPTION

Specific embodiments of the present disclosure will be described in further detail below with reference to the accompanying drawings and embodiments. The following embodiments are used to illustrate the present disclosure, but are not intended to limit the scope of the present disclosure.

Figure 1:
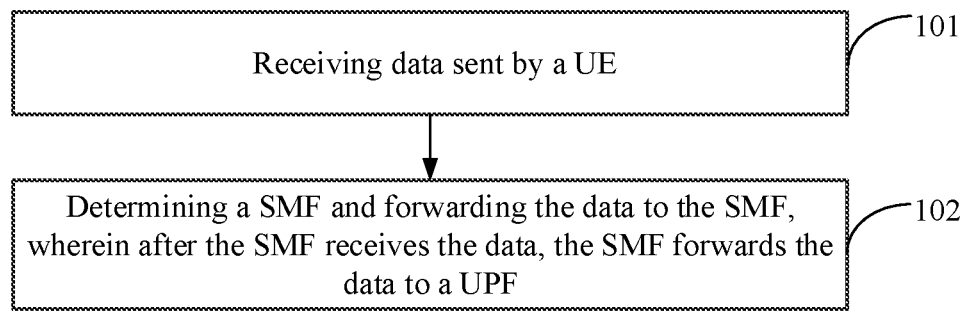
FIG. 1 is a flowchart of a data transmission method according to an embodiment of the present disclosure.

As shown in FIG. 1, a data transmission method according to an embodiment of the present disclosure is applied to an Access and Mobility Management Function (AMF). The method includes steps 101-102.

Step 101: receiving data sent by a User Equipment (UE).

The data is sent by the UE in a Radio Resource Control (RRC) connection establishment process. In the embodiments of the present disclosure, the data may be carried in a NAS Data PDU.

Specifically, the data sent by the UE is sent to the AMF through a base station. The UE carries the data in the NAS Data PDU and sends the same to the base station. After the base station receives the message, the base station sends an N2 message to the AMF through an N2 interface between the base station and the AMF, wherein the N2 message includes the NAS Data PDU. Accordingly, the AMF receives the N2 message sent by the base station, and the N2 message includes the NAS Data PDU.

Step 102: determining a Session Management Function (SMF) and forwarding the data to the SMF, wherein after the SMF receives the data, the SMF forwards the data to a User Plane Function (UPF).

Here, the AMF may determine whether a PDU session is established for the UE. Specifically, the AMF may determine whether the UE has established a PDU session according to UE-related information stored by the AMF. According to whether the UE has established the PDU session, the AMF may determine the SMF using different selection assistance information.

When the UE does not establish a PDU session, the AMF may determine the SMF according to first selection assistance information. The first selection assistance information includes any one or more of following information: a Data Network Name (DNN), slice assistance information (such as network slice selection assistance information (NSSAI)), a local configuration or policy of an operator, a routing indicator, and the like.

When the UE establishes a PDU session, the AMF may determine the SMF according to second selection assistance information. The second selection assistance information is based on any one or more of the following information: a PDU session identifier (PDU Session ID), a Data Network Name (DNN), a slice assistance information (such as the NSSAI), local configuration or policy of an operator, a routing indicator.

How to determine the SMF accord to the above information is not limited in the embodiments of the present disclosure. For example, the SMF may be determined according to correspondence relationship between the above-described information and the SMF. For example, when a determination result indicates that the UE has not established a PDU session, assuming that the SMF is determined according to the NSSAI, then corresponding relationship between the NSSAI and the SMF may be searched according to the NSSAI corresponding to the UE, to determine the SMF when performing specific selection.

In an embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 2:
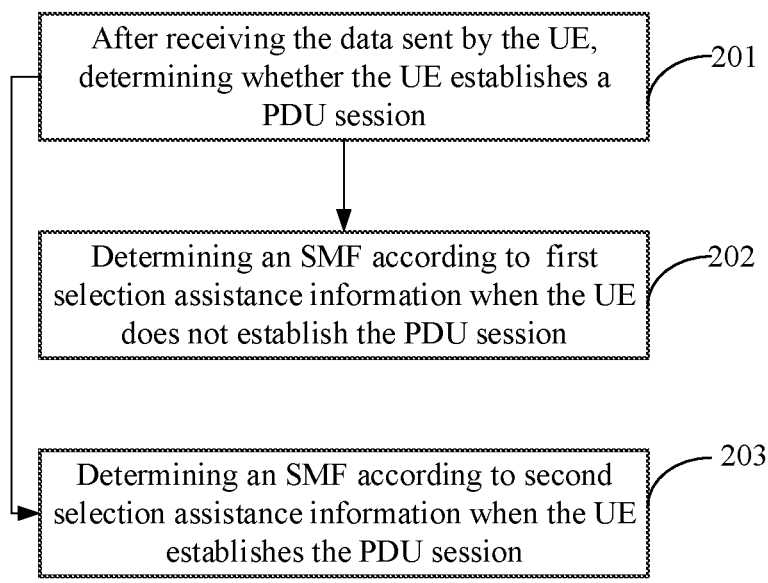
FIG. 2 is a flowchart of a data transmission method according to an embodiment of the present disclosure.

As shown in FIG. 2, a data transmission method according to an embodiment of the present disclosure is applied to the AMF. The AMF includes steps 201-203.

Step 201: after receiving the data sent by the UE, determining whether the UE establishes a PDU session.

Here, it may be determined whether the UE has established a PDU session according to the UE-related information stored in the AMF. In an embodiment of the present disclosure, the data may be carried in a NAS Data PDU.

Step 202: when the UE does not establish a PDU session, determining an SMF according to the first selection assistance information.

Step 203: when the UE establishes a PDU session, determining an SMF according to the second selection assistance information.

The first selection assistance information includes any one or more of following information: a Data Network Name (DNN), slice assistance information (such as NSSAI), a local configuration or policy of an operator, a routing indicator, and the like. The second selection assistance information is based on any one or more of the following information: a PDU session identifier (PDU Session ID), a Data Network Name (DNN), a slice assistance information (such as the NSSAI), local configuration or policy of an operator, a routing indicator.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 3:
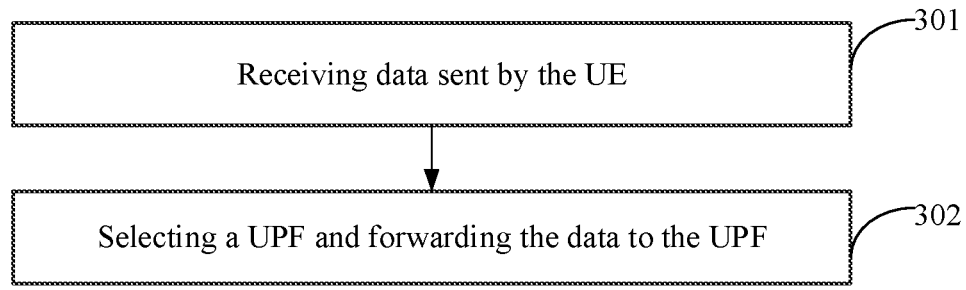
FIG. 3 is a flowchart of a data transmission method according to an embodiment of the present disclosure.

As shown in FIG. 3, a data transmission method according to an embodiment of the present disclosure is applied to the AMF. The method includes steps 301-302.

Step 301: receiving data sent by the UE.

Step 302: selecting a UPF and forwarding the data to the UPF.

Specifically, the UPF is selected according to third selection assistance information; wherein the third selection assistance information includes any one or more of the DNN, the slice assistance information (such as the NSSAI), the local configuration or policy of an operator, and a routing indicator.

In an embodiment of the present disclosure, the data may be carried in a NAS Data PDU.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 4:
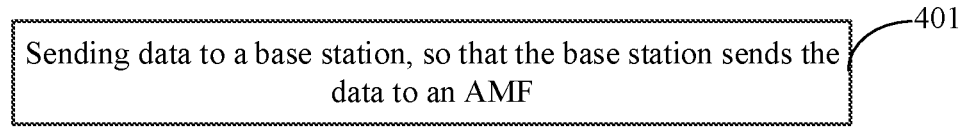
FIG. 4 is a flowchart of a data transmission method according to an embodiment of the present disclosure.

As shown in FIG. 4, a data transmission method according to an embodiment of the present disclosure is applied to a UE. The method includes a step 401.

Step 401: sending data to a base station, so that the base station forwards the data to an AMF.

The data may be carried in a NAS Data PDU.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 5:
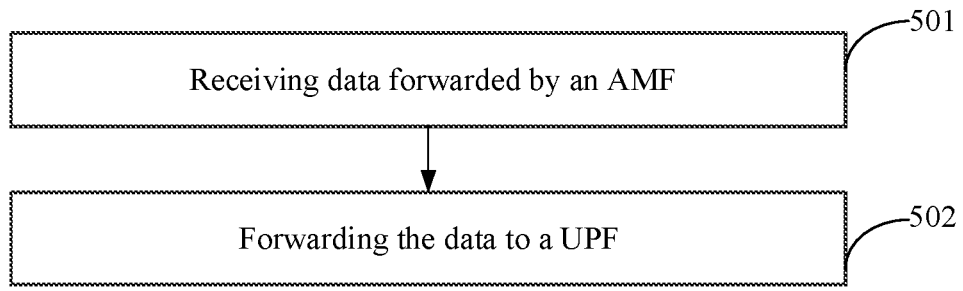
FIG. 5 is a flowchart of a data transmission method according to an embodiment of the present disclosure.

As shown in FIG. 5, a data transmission method according to an embodiment of the present disclosure is applied to an SMF. The method includes steps 501-502.

Step 501: receiving data forwarded by an AMF.

Step 502: forwarding the data to an UPF.

Specifically, the SMF forwards the data to the UPF through an N4 message.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 6:
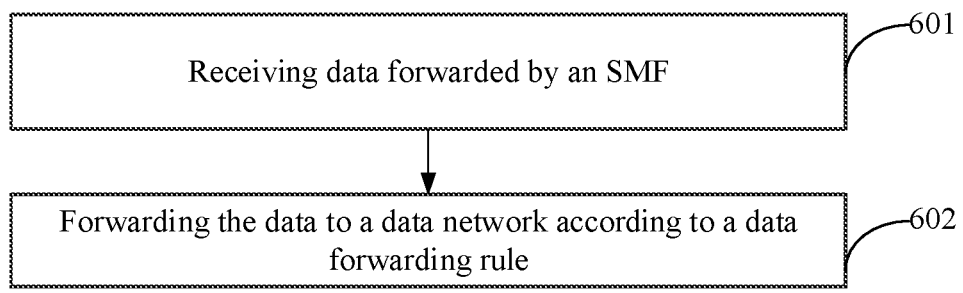
FIG. 6 is a flowchart of a data transmission method according to an embodiment of the present disclosure.

As shown in FIG. 6, a data transmission method according to an embodiment of the present disclosure is applied to a UPF. The method includes steps 601-602.

Step 601: receiving data forwarded by an SMF.

Specifically, the UPF receives the data forwarded by the SMF through the N4 message.

Step 602: forwarding the data to a data network according to a data forwarding rule.

The data forwarding rule may be a predefined data forwarding rule.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 7:
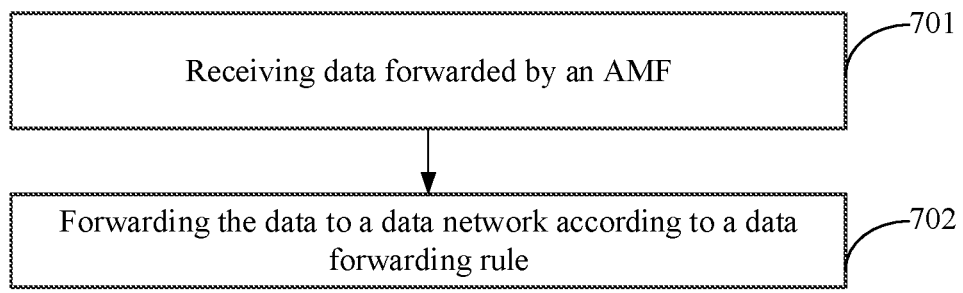
FIG. 7 is a flowchart of a data transmission method according to an embodiment of the present disclosure.

As shown in FIG. 7, a data transmission method according to an embodiment of the present disclosure is applied to a UPF. The method includes steps 701-702.

Step 701: receiving data forwarded by an AMF.

Step 702: forwarding the data to the data network according to a data forwarding rule.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 8:
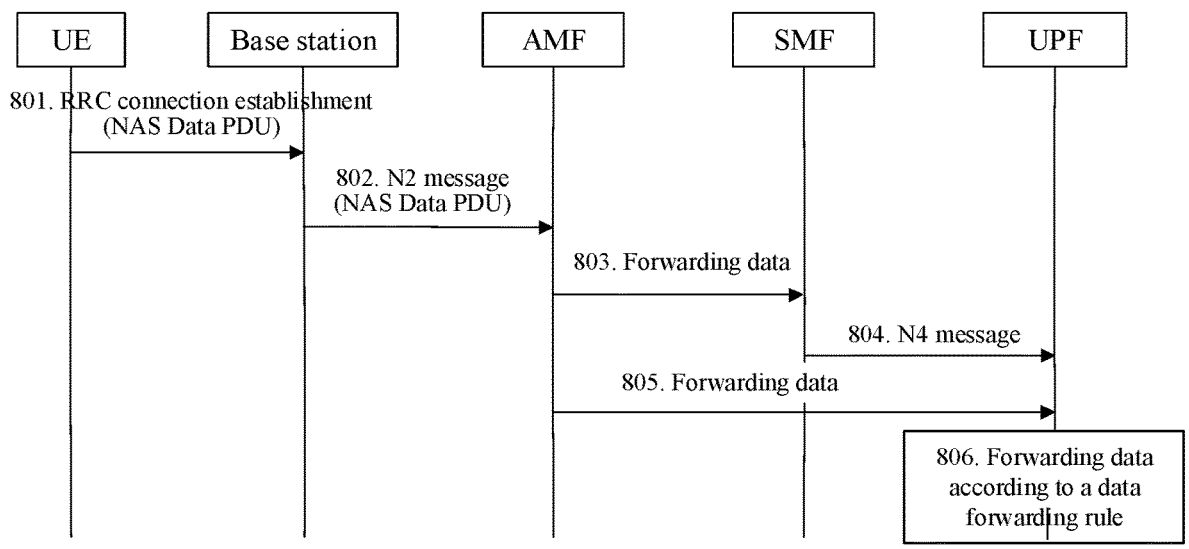
FIG. 8 is a flowchart of a data transmission method according to an embodiment of the present disclosure.

As shown in FIG. 8, a data transmission method according to an embodiment of the present disclosure includes steps 801-806.

Step 801: in an RRC connection establishment process, sending a NAS Data PDU to a base station by a UE, wherein the NAS Data PDU carries data to be sent encapsulated in the NAS Data PDU.

Step 802: after the base station receives the NAS Data PDU, sending an N2 message (e.g., Initial UE message) to an AMF by the base station through an N2 interface, wherein the N2 message carries the NAS Data PDU sent by the UE.

After the AMF receives the data, there are two different processing modes between the AMF and SMF and between the AMF and UPF.

A first mode includes steps 803 and 804, that is, the AMF forwards the data to the determined SMF, and then the SMF forwards the data to the UPF.

Step 803: analyzing, by the AMF, the N2 message sent from a RAN side through the N2 interface, identifying a message type of the NAS Data PDU by the AMF, and obtaining the data sent by the UE.

When the UE does not establish a PDU session, the AMF selects the corresponding SMF according to any one or a combination of a DNN, slice assistance information (such as the NSSAI), a configuration/policy of an operator, a routing indicator, etc. and sends the data to the SMF. When the UE has established a PDU session, the AMF selects an SMF according to any one or a combination of a PDU Session ID, the DNN, the slice assistance information (such as NSSAI), the configuration/policy of the operator, routing indicator, etc., and sends the data to the SMF.

Step 804: sending the data to the UPF by the SMF through an N4 message.

A second mode includes a step 805 in which the AMF directly forwards the data to the selected UPF.

Step 805: selecting a UPF by the AMF according to any one or a combination of the DNN, the slice assistance information, configuration/policy of an operator, the routing indicator, etc. and sending the data to the UPF by the AMF.

Step 806: forwarding the data according to a data forwarding rule.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Meanwhile, the technical solutions of the embodiments of the present disclosure optimize and simplify a data transmission mode of a 5G network, and is particularly suitable for transmission of small data in a 5G network.

Figure 9:
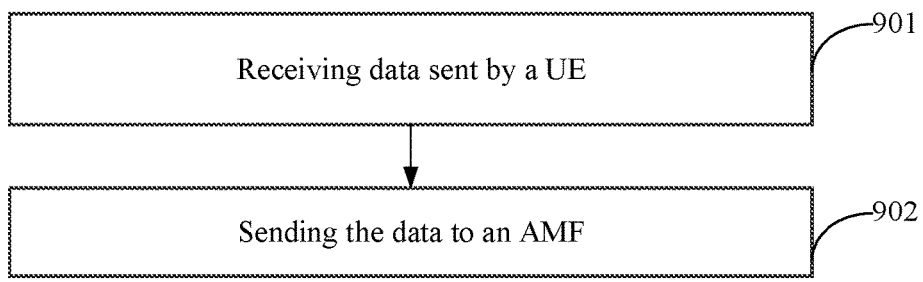
FIG. 9 is a flowchart of a data transmission method according to an embodiment of the present disclosure.

As shown in FIG. 9, a data transmission method according to an embodiment of the present disclosure is applied to a base station. The method includes steps 901-902.

Step 901: receiving data sent by a UE.

The data is carried in a NAS Data PDU.

Step 902: forwarding the data to an AMF.

Specifically, the base station forwards the data to the AMF through an N2 message.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 10:
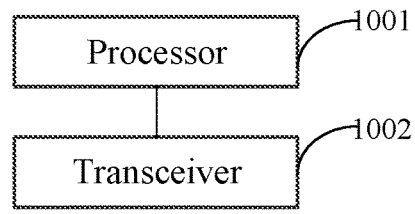
FIG. 10 is a schematic diagram of a data transmission apparatus according to an embodiment of the present disclosure.

As shown in FIG. 10, a data transmission apparatus of an embodiment of the present disclosure includes a processor 1001 and a transceiver 1002.

The transceiver 1002 is configured to receive data sent by a User Equipment (UE).

The processor 1001 is configured to determine a Session Management Function (SMF) and forward the data to the SMF, wherein after the SMF receives the data, the SMF forwards the data to a User Plane Function (UPF).

The processor 1001 is further configured to determine whether the UE establishes a PDU session; when the UE does not establish a PDU session, determining an SMF according to first selection assistance information; when the UE establishes a PDU session, determining an SMF according to second selection assistance information.

The first selection assistance information includes any one or more of following information: a Data Network Name (DNN), slice assistance information, a local configuration or policy of an operator, a routing indicator, and the like. The second selection assistance information includes any one or more of the following information: a PDU session identifier, a DNN, a slice assistance information, a local configuration or policy of an operator, a routing indicator.

The data is carried in a NAS Data PDU.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 11:
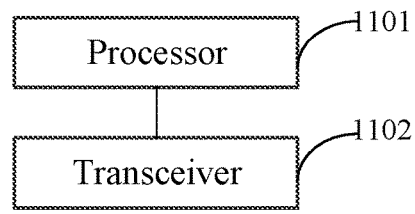
FIG. 11 is a schematic diagram of a data transmission apparatus according to an embodiment of the present disclosure.

As shown in FIG. 11, a data transmission apparatus of an embodiment of the present disclosure includes a processor 1101 and a transceiver 1102.

The processor 1101 is configured to, after the data sent by the UE is received through the transceiver 1102, determine whether the UE establishes a PDU session; when the UE does not establish a PDU session, determining an SMF according to first selection assistance information; when the UE establishes a PDU session, determining an SMF according to second selection assistance information.

The first selection assistance information includes any one or more of following information: a Data Network Name (DNN), slice assistance information, a local configuration or policy of an operator, and a routing indicator. The second selection assistance information includes any one or more of the following information: a PDU session identifier, a DNN, slice assistance information, local configuration or policy of an operator, and a routing indicator.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 12:
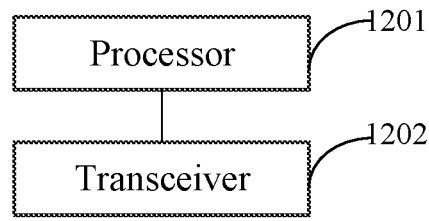
FIG. 12 is a schematic diagram of a data transmission apparatus according to an embodiment of the present disclosure.

As shown in FIG. 12, a data transmission apparatus of an embodiment of the present disclosure includes a processor 1201 and a transceiver 1202.

The transceiver 1202 is configured to receive data sent by a User Equipment (UE).

The processor 1201 is configured to select a User Plane Function (UPF) and forward the data to the UPF. The processor 1201 is further configured to forward the data to the UPF through an N4 message.

The processor 1201 is further configured to select a UPF according to third selection assistance information, wherein, the third selection assistance information includes any one or more of following: a DNN, slice assistance information, a local configuration or policy of an operator, and a routing indicator.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 13:
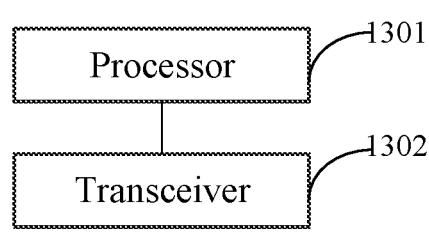
FIG. 13 is a schematic diagram of a data transmission apparatus according to an embodiment of the present disclosure.

As shown in FIG. 13, a data transmission apparatus of an embodiment of the present disclosure includes a processor 1301 and a transceiver 1302.

The processor 1301 is configured to receive, through the transceiver 1302, data forwarded by an SMF, and forward the data to the data network through the transceiver according to a data forwarding rule.

The transceiver 1302 is further configured to receive the data forwarded by the SMF through an N4 message.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 14:
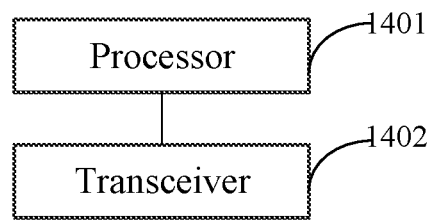
FIG. 14 is a schematic diagram of a data transmission apparatus according to an embodiment of the present disclosure.

As shown in FIG. 14, a data transmission apparatus of an embodiment of the present disclosure includes a processor 1401 and a transceiver 1402.

The processor 1401 is configured to receive, through the transceiver 1402, data forwarded by an AMF, and forward the data to the data network according to a data forwarding rule.

Figure 15:
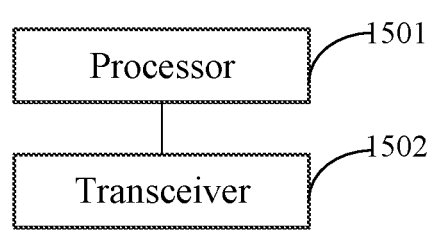
FIG. 15 is a schematic diagram of a data transmission apparatus according to an embodiment of the present disclosure.

As shown in FIG. 15, a data transmission apparatus of an embodiment of the present disclosure includes a processor 1501 and a transceiver 1502.

The processor 1501 is configured to send data to a base station through the transceiver 1502 so that the base station forwards the data to an AMF.

The data is carried in an NAS Data PDU.

Figure 16:
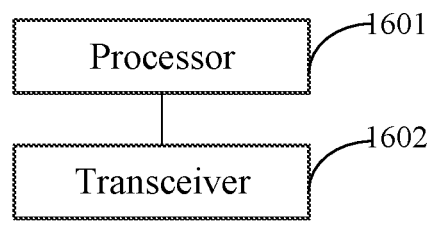
FIG. 16 is a schematic diagram of a data transmission apparatus according to an embodiment of the present disclosure.

As shown in FIG. 16, a data transmission apparatus of an embodiment of the present disclosure includes a processor 1601 and a transceiver 1602.

The processor 1601 is configured to receive, through the transceiver 1602, data sent by a UE, and forward the data to an AMF.

The data is carried in a NAS Data PDU.

The transceiver 1602 is further configured to forward the data to the AMF through an N2 message.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 17:
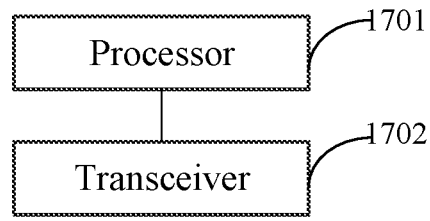
FIG. 17 is a schematic diagram of a data transmission apparatus according to an embodiment of the present disclosure.

As shown in FIG. 17, a data transmission apparatus of an embodiment of the present disclosure includes a processor 1701 and a transceiver 1702.

The processor 1701 is configured to receive, through the transceiver 1702, data forwarded by an AMF, and forward the data to a UPF.

The processor 1701 is further configured to forward the data to the UPF through an N4 message.

In the embodiment of the present disclosure, the UE sends the data to the AMF so that the AMF can forward the data to the SMF and then the SMF forwards the data to the UPF, or the AMF directly sends the data to the UPF and then the UPF forwards the data to the data network. Therefore, the technical solution using the embodiment of the present disclosure does not need to wait for the data to be sent after the PDU session is established, thereby reducing interaction between the UE and other entities, and saving communication resources.

Figure 18:
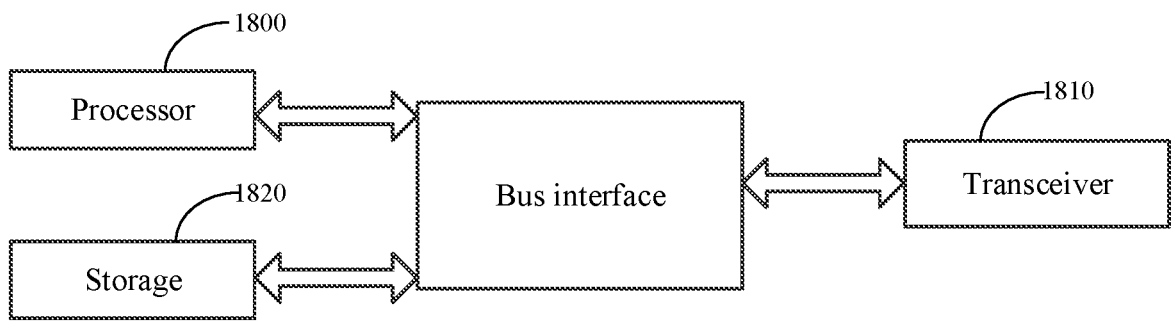
FIG. 18 is a schematic diagram of a communication device according to an embodiment of the present disclosure.

As shown in FIG. 18, a communication device of an embodiment of the present disclosure includes a processor 1800 configured to read a program in a storage 1820 and perform following steps: receiving, through a transceiver 1810, data sent by a User Equipment (UE); determining a Session Management Function (SMF) and forwarding the data to an SMF, wherein after the SMF receives the data, the SMF forwards the data to a User Plane Function (UPF).

The transceiver 1810 is configured to receive and transmit data under a control of the processor 1800.

In FIG. 18, a bus architecture may include any number of interconnected buses and bridges, specifically various circuits such as one or more processors represented by the processor 1800 and a memory represented by the storage 1820 are linked together. The bus architecture may also link together various other circuits, such as peripheral devices, voltage regulators, and power management circuits, which are well known in the art, and thus will not be described further herein. The bus interface provides an interface. The transceiver 1810 may be a plurality of elements, i.e., including a transmitter and a receiver, for providing elements for communicating with various other devices over a transmission medium. The processor 1800 is responsible for managing the bus architecture and general processing, and the storage 1820 may store data used by the processor 1800 when performing operations.

The processor 1800 is further configured to read the computer program and perform the following steps: determining whether the UE establishes a PDU session; when the UE does not establish a PDU session, determining an SMF according to first selection assistance information; when the UE establishes a PDU session, determining an SMF according to second selection assistance information.

The first selection assistance information includes any one or more of following information: a Data Network Name (DNN), slice assistance information, a local configuration or policy of an operator, and a routing indicator. The second selection assistance information includes any one or more of the following information: a PDU session identifier, a DNN, slice assistance information, a local configuration or policy of an operator, and a routing indicator.

The data is carried in a Non-Access-Stratum Data Protocol Data Unit (NAS Data PDU).

Figure 19:
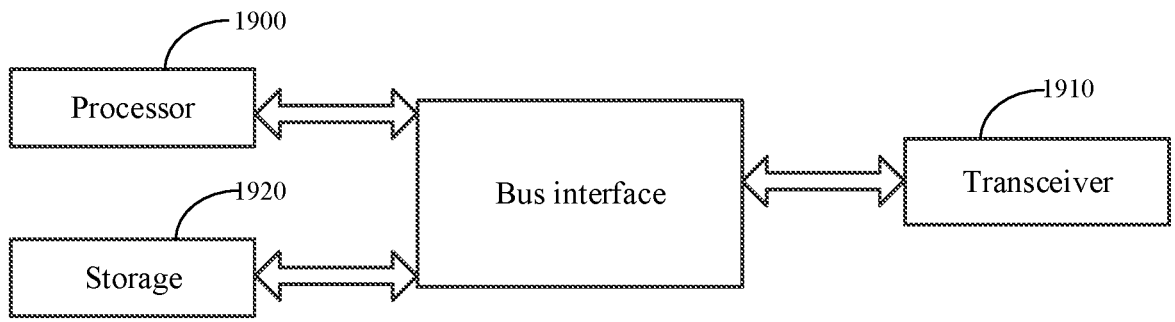
FIG. 19 is a schematic diagram of a communication device according to an embodiment of the present disclosure.

As shown in FIG. 19, a communication device of an embodiment of the present disclosure includes a processor 1900 configured to read a program in the storage 1920 and perform following steps: after data sent by a UE is received, determining whether the UE establishes a PDU session; when the UE does not establish a PDU session, determining an SMF according to first selection assistance information; when the UE establishes a PDU session, determining an SMF according to second selection assistance information.

A transceiver 1910 is configured to receive and transmit data under a control of the processor 1900.

In FIG. 19, a bus architecture may include any number of interconnected buses and bridges, specifically various circuits such as one or more processors represented by the processor 1900 and a memory represented by the storage 1920 are linked together. The bus architecture may also link together various other circuits, such as peripheral devices, voltage regulators, and power management circuits, which are well known in the art, and thus will not be described further herein. The bus interface provides an interface. The transceiver 1910 may be a plurality of elements, i.e., including a transmitter and a receiver, for providing elements for communicating with various other devices over a transmission medium. The processor 1900 is responsible for managing the bus architecture and general processing, and the storage 1920 may store data used by the processor 1900 when performing operations.

The first selection assistance information includes any one or more of following information: a Data Network Name (DNN), slice assistance information, a local configuration or policy of an operator, and a routing indicator. The second selection assistance information includes any one or more of the following information: a PDU session identifier, a DNN, slice assistance information, local configuration or policy of an operator, and a routing indicator.

Figure 20:
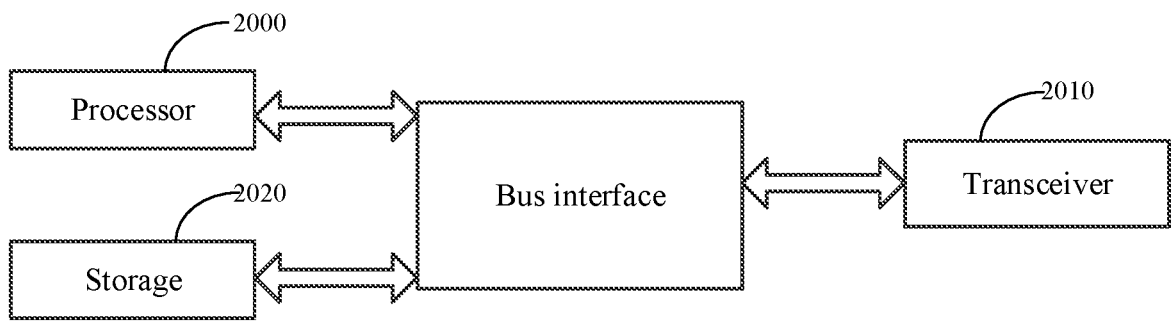
FIG. 20 is a schematic diagram of a communication device according to an embodiment of the present disclosure.

As shown in FIG. 20, a communication device of an embodiment of the present disclosure includes a processor 2000 configured to read a program in the storage 2020 and perform following steps: receiving, through a transceiver 2010, data sent by a User Equipment (UE); selecting a User Plane Function (UPF) and forwarding the data to the UPF.

The transceiver 2010 is configured to receive and transmit data under a control of the processor 2000.

In FIG. 20, a bus architecture may include any number of interconnected buses and bridges, specifically various circuits such as one or more processors represented by the processor 2000 and a memory represented by the storage 2020 are linked together. The bus architecture may also link together various other circuits, such as peripheral devices, voltage regulators, and power management circuits, which are well known in the art, and thus will not be described further herein. The bus interface provides an interface. The transceiver 2010 may be a plurality of elements, i.e., including a transmitter and a receiver, for providing elements for communicating with various other devices over a transmission medium. The processor 2000 is responsible for managing the bus architecture and general processing, and the storage 2020 may store data used by the processor 2000 when performing operations.

The processor 2000 is responsible for managing the bus architecture and general processing, and the storage 2020 may store data used by the processor 2000 when performing operations.

The processor 2000 is further configured to read the computer program and perform following steps: selecting a UPF according to third selection assistance information, wherein, the third selection assistance information includes any one or more of following: a DNN, slice assistance information, a local configuration or policy of an operator, and a routing indicator.

Figure 21:
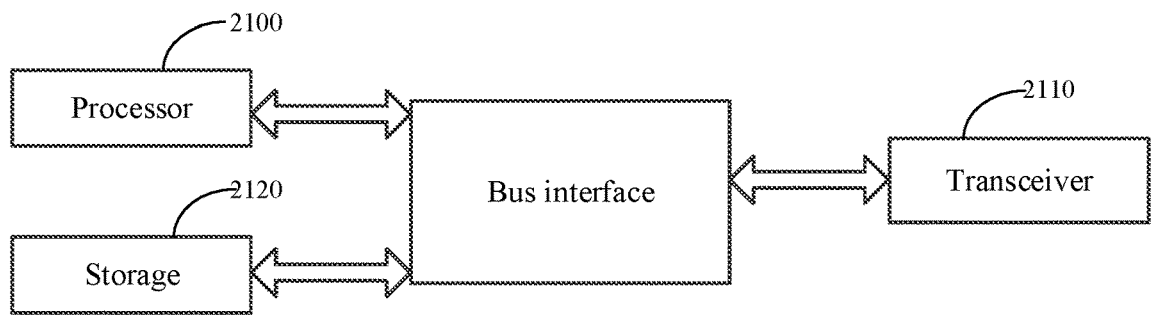
FIG. 21 is a schematic diagram of a communication device according to an embodiment of the present disclosure.

As shown in FIG. 21, a communication device of an embodiment of the present disclosure includes a processor 2100 configured to read a program in a storage 2120 and perform following steps: receiving, through a transceiver 2110, data forwarded by an AMF, and forwarding the data to a UPF.

The transceiver 2110 is configured to receive and transmit data under a control of the processor 2100.

In FIG. 21, a bus architecture may include any number of interconnected buses and bridges, specifically various circuits such as one or more processors represented by the processor 2100 and a memory represented by the storage 2120 are linked together. The bus architecture may also link together various other circuits, such as peripheral devices, voltage regulators, and power management circuits, which are well known in the art, and thus will not be described further herein. The bus interface provides an interface. The transceiver 2110 may be a plurality of elements, i.e., including a transmitter and a receiver, for providing elements for communicating with various other devices over a transmission medium. The processor 2100 is responsible for managing the bus architecture and general processing, and the storage 2120 may store data used by the processor 2100 when performing operations.

The processor 2100 is responsible for managing the bus architecture and general processing, and the storage 2020 may store data used by the processor 2000 when performing operations.

The processor 2100 is further configured to read the computer program and perform a following step: forwarding the data to a UPF through an N4 message.

Figure 22:
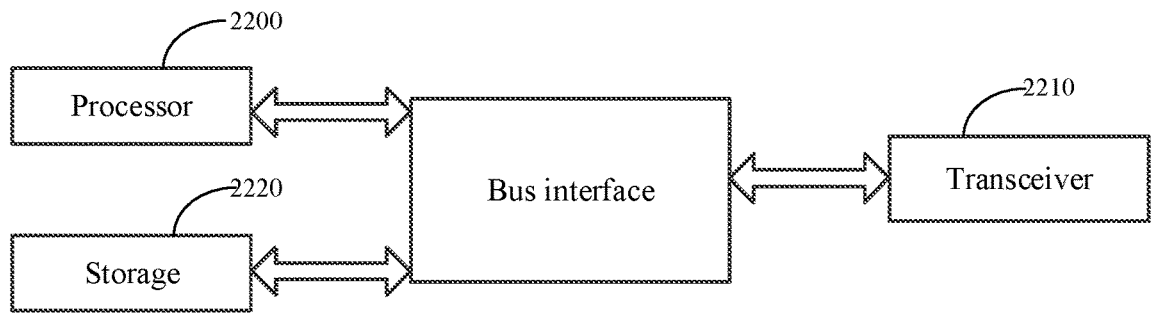
FIG. 22 is a schematic diagram of a communication device according to an embodiment of the present disclosure.

As shown in FIG. 22, a communication device of an embodiment of the present disclosure includes a processor 2200 configured to read a program in a storage 2220 and perform following steps: receiving, through a transceiver 2210, data forwarded by an SMF, and forwarding the data to the data network according to a data forwarding rule.

The transceiver 2210 is configured to receive and transmit data under a control of the processor 2200.

In FIG. 22, a bus architecture may include any number of interconnected buses and bridges, specifically various circuits such as one or more processors represented by the processor 2200 and a memory represented by the storage 2220 are linked together. The bus architecture may also link together various other circuits, such as peripheral devices, voltage regulators, and power management circuits, which are well known in the art, and thus will not be described further herein. The bus interface provides an interface. The transceiver 2210 may be a plurality of elements, i.e., including a transmitter and a receiver, for providing elements for communicating with various other devices over a transmission medium. The processor 2200 is responsible for managing the bus architecture and general processing, and the storage 2220 may store data used by the processor 2200 when performing operations.

The processor 2200 is responsible for managing the bus architecture and general processing, and the storage 2220 may store data used by the processor 2200 when performing operations.

The processor 2200 is further configured to read the computer program and perform a following step: receiving the data forwarded by the SMF through an N4 message.

Figure 23:
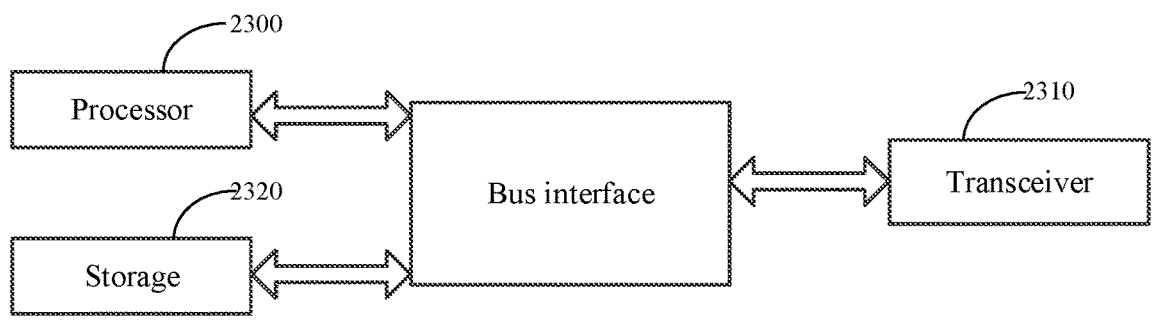
FIG. 23 is a schematic diagram of a communication device according to an embodiment of the present disclosure.

As shown in FIG. 23, a communication device of an embodiment of the present disclosure includes a processor 2300 configured to read a program in a storage 2320 and perform following steps: receiving data forwarded by an AMF, and forwarding the data to the data network according to a data forwarding rule.

A transceiver 2310 is configured to receive and transmit data under a control of the processor 2300.

In FIG. 23, a bus architecture may include any number of interconnected buses and bridges, specifically various circuits such as one or more processors represented by the processor 2300 and a memory represented by the storage 2320 are linked together. The bus architecture may also link together various other circuits, such as peripheral devices, voltage regulators, and power management circuits, which are well known in the art, and thus will not be described further herein. The bus interface provides an interface. The transceiver 2310 may be a plurality of elements, i.e., including a transmitter and a receiver, for providing elements for communicating with various other devices over a transmission medium. The processor 2300 is responsible for managing the bus architecture and general processing, and the storage 2320 may store data used by the processor 2300 when performing operations.

The processor 2300 is responsible for managing the bus architecture and general processing, and the storage 2320 may store data used by the processor 2300 when performing operations.

Figure 24:
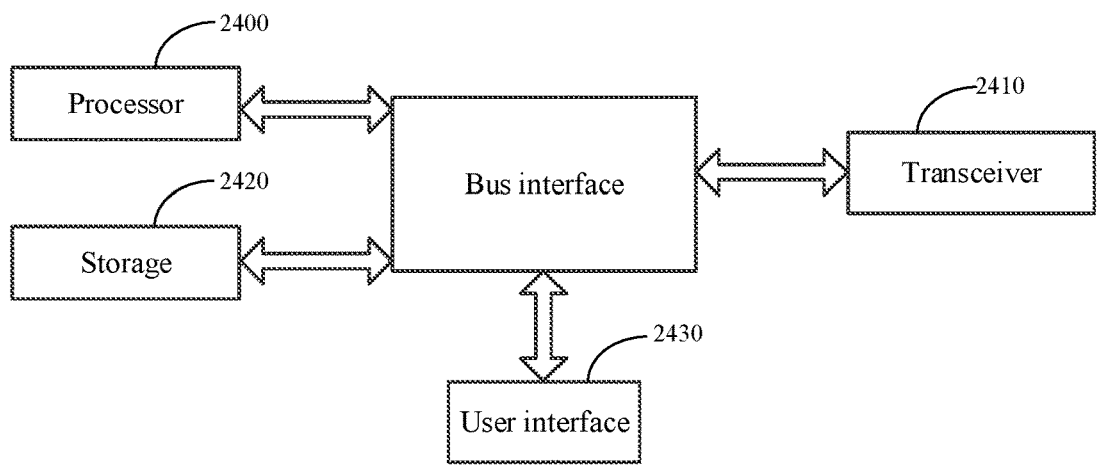
FIG. 24 is a schematic diagram of a communication device according to an embodiment of the present disclosure.

As shown in FIG. 24, a communication device of an embodiment of the present disclosure includes a processor 2400 configured to read a program in a storage 2420 and perform a following step: sending data to a base station through a transceiver 2410 so that the base station forwards the data to an AMF.

The transceiver 2410 is configured to receive and transmit data under a control of the processor 2400.

In FIG. 24, a bus architecture may include any number of interconnected buses and bridges, specifically various circuits such as one or more processors represented by the processor 2400 and a memory represented by the storage 2420 are linked together. The bus architecture may also link together various other circuits, such as peripheral devices, voltage regulators, and power management circuits, which are well known in the art, and thus will not be described further herein. The bus interface provides an interface. The transceiver 2410 may be a plurality of elements, i.e., including a transmitter and a receiver, for providing elements for communicating with various other devices over a transmission medium. For different user equipments, a user interface 2430 may be a device which may be connected with an internal device or an external device including, but being not limited to a keypad, a display, a speaker, a microphone, a joystick, and the like.

The processor 2400 is responsible for managing the bus architecture and general processing, and the storage 2420 may store data used by the processor 2400 when performing operations.

The data is carried in a NAS Data PDU.

Figure 25:
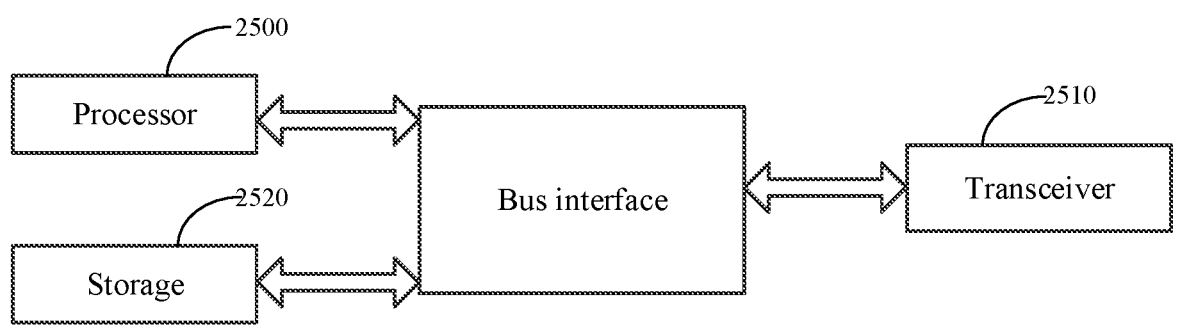
FIG. 25 is a schematic diagram of a communication device according to an embodiment of the present disclosure.

As shown in FIG. 25, a communication device of an embodiment of the present disclosure includes a processor 2500 configured to read a program in a storage 2520 and perform following steps: receiving, through a transceiver 2510, data sent by a UE, and forwarding the data to an AMF.

The transceiver 2510 is configured to receive and transmit data under a control of the processor 2400.

In FIG. 25, a bus architecture may include any number of interconnected buses and bridges, specifically various circuits such as one or more processors represented by the processor 2500 and a memory represented by the storage 2520 are linked together. The bus architecture may also link together various other circuits, such as peripheral devices, voltage regulators, and power management circuits, which are well known in the art, and thus will not be described further herein. The bus interface provides an interface. The transceiver 2510 may be a plurality of elements, i.e., including a transmitter and a receiver, for providing elements for communicating with various other devices over a transmission medium. The processor 2500 is responsible for managing the bus architecture and general processing, and the storage 2525 may store data used by the processor 2500 when performing operations.

The processor 2500 is responsible for managing the bus architecture and general processing, and the storage 2520 may store data used by the processor 2500 when performing operations.

The data is carried in a NAS Data PDU.

Further, a computer-readable storage medium of an embodiment of the present disclosure is used to store a computer program that can be executed by a processor to implement following steps: receiving data sent by a User Equipment (UE); determining a Session Management Function (SMF) and forwarding the data to an SMF, wherein after the SMF receives the data, the SMF forwards the data to a User Plane Function (UPF).

Determining the SMF includes: determining whether the UE establishes a Protocol Data Unit (PDU) session; when the UE does not establish a PDU session, determining an SMF according to first selection assistance information; when the UE establishes a PDU session, determining an SMF according to second selection assistance information.

The first selection assistance information includes any one or more of following information: a Data Network Name (DNN), slice assistance information, a local configuration or policy of an operator, and a routing indicator. The second selection assistance information includes any one or more of the following information: a PDU session identifier, a DNN, slice assistance information, a local configuration or policy of an operator, and a routing indicator.

The data is carried in a Non-Access-Stratum Data Protocol Data Unit (NAS Data PDU).

Further, a computer-readable storage medium of an embodiment of the present disclosure is used to store a computer program that can be executed by a processor to implement following steps: after data sent by a UE is received, determining whether the UE establishes a PDU session; when the UE does not establish a PDU session, determining an SMF according to first selection assistance information; when the UE establishes a PDU session, determining an SMF according to second selection assistance information.

The first selection assistance information includes any one or more of following information: a Data Network Name (DNN), slice assistance information, a local configuration or policy of an operator, and a routing indicator. The second selection assistance information includes any one or more of the following information: a PDU session identifier, a DNN, slice assistance information, local configuration or policy of an operator, and a routing indicator.

Further, a computer-readable storage medium of an embodiment of the present disclosure is used to store a computer program that can be executed by a processor to implement following steps: receiving data sent by a User Equipment (UE); selecting a User Plane Function (UPF) and forwarding the data to the UPF.

Selecting the UPF includes: selecting the UPF according to third selection assistance information, wherein, the third selection assistance information includes any one or more of following: a DNN, slice assistance information, a local configuration or policy of an operator, and a routing indicator.

Further, a computer-readable storage medium of an embodiment of the present disclosure is used to store a computer program that can be executed by a processor to implement following steps: receiving data forwarded by an AMF, and forwarding the data to a UPF.

Forwarding the data to the UPF includes: forwarding the data to the UPF through an N4 message.

Further, a computer-readable storage medium of an embodiment of the present disclosure is used to store a computer program that can be executed by a processor to implement following steps: receiving data forwarded by an SMF, and forwarding the data to the data network according to a data forwarding rule.

Receiving the data forwarded by the SMF includes: receiving the data forwarded by the SMF through an N4 message.

Further, a computer-readable storage medium of an embodiment of the present disclosure is used to store a computer program that can be executed by a processor to implement following steps: receiving data forwarded by an AMF, and forwarding the data to the data network according to a data forwarding rule.

Further, a computer-readable storage medium of an embodiment of the present disclosure is used to store a computer program that can be executed by a processor to implement following steps: sending data to a base station so that the base station forwards the data to an AMF.

The data is carried in a NAS Data PDU.

Further, a computer-readable storage medium of an embodiment of the present disclosure is used to store a computer program that can be executed by a processor to implement following steps: receiving data sent by a UE, and forwarding the data to an AMF.

The data is carried in a NAS Data PDU.

Forwarding the data to the AMF includes: forwarding the data to the AMF through an N2 message.

In several embodiments provided herein, it should be understood that the disclosed methods and apparatuses may be implemented in other ways. For example, the device embodiments described above are merely illustrative, for example, a division of units is only one logical functional division, and there may be another division in actual implementation. For example, multiple units or components may be combined or may be integrated into another system, or some features may be ignored or not performed. Additionally, a coupling or a direct coupling or a communication connection shown or discussed with respect to each other may be an indirect coupling or a communication connection through some interfaces, devices, or units, and may be in electrical, mechanical, or other form.

In addition, various functional units in various embodiments of the present disclosure may be integrated in one processing unit, may be separately physically included in a unit, or one or more units may be integrated in one unit. The integrated unit may be implemented either in the form of hardware or in the form of a functional unit of hardware plus software.

The integrated unit implemented in the form of a software functional unit described above may be stored in a computer-readable storage medium. The software function unit is stored in a storage medium including instructions for enabling a computer device (which may be a personal computer, a server, or a network device or the like) to perform a part of steps of sending or receiving method according to various embodiments of the present disclosure. The storage medium includes a USB disk, a removable hard disk, a Read-Only Memory (ROM), a Random Access Memory (RAM), a magnetic disk or an optical disk, and various kinds of media capable of storing program codes.

The above are optional embodiments of the present disclosure. It should be noted that several improvements and embellishments may also be made by those of ordinary skill in the art without departing from the principles described in the present disclosure. These improvements and embellishments should also be considered to be within the protection scope of the present disclosure.

What is claimed is:

1. A data transmission method performed by an Access and Mobility Management Function (AMF), comprising:
   receiving a Non-Access-Stratum Data Protocol Data Unit (NAS Data PDU) sent by a User Equipment (UE), wherein the NAS Data PDU carries user plane data and the NAS Data PDU is sent by the UE when the UE is establishing a Radio Resource Control (RRC) connection;
   determining a Session Management Function (SMF) and forwarding the user plane data to the SMF, wherein after the SMF receives the user plane data, the SMF forwards the user plane data to a User Plane Function (UPF).

2. The method according to claim 1, wherein determining the SMF comprises:
   determining whether the UE establishes a Protocol Data Unit (PDU) session;
   when the UE does not establish the PDU session, determining the SMF according to first selection assistance information;
   when the UE establishes the PDU session, determining the SMF according to second selection assistance information.

3. The method according to claim 2, wherein, the first selection assistance information comprises any one or more of following: a Data Network Name (DNN), slice assistance information, a local configuration or policy of an operator, and a routing indicator;
   the second selection assistance information comprises any one or more of following information: a PDU session identifier, a DNN, slice assistance information, a local configuration or policy of an operator, and a routing indicator.

4. A communication device, comprising a transceiver, a storage, a processor, and a computer program stored on the storage and executable by the processor, wherein, when the computer program is executed by the processor, the processor implements steps in the method according to claim 1.

5. A data transmission method performed by a Session Management Function (SMF), comprising:
   receiving user plane data forwarded by an Access and Mobility Management Function (AMF), wherein the user plane data is carried in a Non-Access-Stratum Data Protocol Data Unit (NAS Data PDU) sent by a UE to the AMF when the UE is establishing a Radio Resource Control (RRC) connection;
   forwarding the user plane data to a User Plane Function (UPF).

6. The method according to claim 5, wherein forwarding the user plane data to the UPF, comprises:
   forwarding the user plane data to the UPF through a N4 message.

7. A communication device, comprising a transceiver, a storage, a processor, and a computer program stored on the storage and executable by the processor, wherein, when the computer program is executed by the processor, the processor implements steps in the method according to claim 5.

8. A data transmission method performed by a User Plane Function (UPF), comprising:
   receiving user plane data forwarded by a Session Management Function (SMF), wherein the user plane data is carried in a Non-Access-Stratum Data Protocol Data Unit (NAS Data PDU) sent by a UE to an AMF when the UE is establishing a Radio Resource Control (RRC) connection, and the data is forwarded by the AMF to the SMF;
   forwarding the user plane data to a data network according to a data forwarding rule.

9. The method according to claim 8, wherein receiving the user plane data forwarded by the SMF comprises:
receiving the user plane data forwarded by the SMF through a N4 message.

10. A communication device, comprising a transceiver, a storage, a processor, and a computer program stored on the storage and executable by the processor, wherein, when the computer program is executed by the processor, the processor implements steps in the method according to claim 8.

11. A data transmission method performed by a User Equipment (UE), comprising:
sending a Non-Access-Stratum Data Protocol Data Unit (NAS Data PDU) to a base station when the UE is establishing a Radio Resource Control (RRC) connection so that the base station forwards the NAS Data PDU to an Access and Mobility Management Function (AMF), wherein the NAS Data PDU carries user plane data.

12. A communication device, comprising a transceiver, a storage, a processor, and a computer program stored on the storage and executable by the processor, wherein, when the computer program is executed by the processor, the processor implements steps in the method according to claim 11.

13. A data transmission method performed by a base station, comprising:
receiving Non-Access-Stratum Data Protocol Data Unit (NAS Data PDU) sent by a User Equipment (UE) when the UE is establishing a Radio Resource Control (RRC) connection, wherein the NAS Data PDU carries user plane data;
forwarding the NAS Data PDU to an Access and Mobility Management Function (AMF).

14. The method according to claim 13, wherein forwarding the NAS Data PDU to the AMF comprises:
forwarding the NAS Data PDU to the AMF through a N2 message.

15. A communication device, comprising a transceiver, a storage, a processor, and a computer program stored on the storage and executable by the processor, wherein, when the computer program is executed by the processor, the processor implements steps in the method according to claim 13.

* * * * *